(12) United States Patent
Kim et al.

(10) Patent No.: US 7,199,554 B2
(45) Date of Patent: Apr. 3, 2007

(54) DESKTOP CHARGER FOR BAR-TYPE PORTABLE WIRELESS TERMINAL

(75) Inventors: Sung-Kwon Kim, Seoul (KR); Chang-Soo Lee, Inchonkwangyok-shi (KR); Seung-Min Park, Seoul (KR); Jun-Sang Park, Anyang-shi (KR); Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 10/791,562

(22) Filed: Mar. 2, 2004

(65) Prior Publication Data

US 2004/0174137 A1 Sep. 9, 2004

(30) Foreign Application Priority Data

Mar. 6, 2003 (KR) .................. 10-2003-0014067

(51) Int. Cl.
*H02J 7/00* (2006.01)
(52) U.S. Cl. .................. 320/114; 320/115; 320/107
(58) Field of Classification Search ................ 320/114, 320/115, 107
See application file for complete search history.

(56) References Cited

U.S. PATENT DOCUMENTS 5,847,541 A * 12/1998 Hahn .................. 320/111

2002/0043958 A1 * 4/2002 Yamaguchi et al. ........ 320/113

FOREIGN PATENT DOCUMENTS

JP 2002281119 * 9/2002

* cited by examiner

*Primary Examiner*—Karl Easthom
*Assistant Examiner*—Yalkew Fantu
(74) *Attorney, Agent, or Firm*—The Farrell Law Firm

(57) ABSTRACT

A desktop charger for a portable wireless terminal, comprising: a charger housing; a slot for receiving and holding a stationary body of the terminal, the slot being recessed a determined depth from the front side toward the rear side of the charger housing; and an opening for providing a rotation space for a rotatable body coupled to an end of the stationary body rotatably, the opening extending from a side of the slot in the transverse direction and penetrating the charger housing from its front side to its rear side. The lower body of the terminal can rotate even when the terminal is mounted on the desktop charger. Therefore, the user can perform video communication during charging by using the provided display device and camera lens unit. In addition, wireless communication modules installed at the desktop charger make the connection with an auxiliary device or data communication device easier.

16 Claims, 9 Drawing Sheets

DESKTOP CHARGER FOR BAR-TYPE PORTABLE WIRELESS TERMINAL

PRIORITY

This application claims priority to an application entitled "Desktop Charger for Bar-type Portable Wireless Terminal" filed with the Korean Intellectual Property Office on Mar. 6, 2003 and assigned Ser. No. 2003-14067, the contents of which are hereby incorporated by reference.

BACKGROUND OF THE INVENTION

1. Field of the Invention

The present invention relates to a portable wireless terminal, and more particularly to a desktop charger for a portable wireless terminal.

2. Description of the Related Art

Portable wireless terminals are commonly classified by appearance into bar-type, flip-type and folder-type terminals.

The bar-type terminal advantageously has a simple configuration in that it comprises a key pad as a data-inputting means, a display device as a data-outputting means, a transmitter module and a receiver module, all of which are mounted on the housing of the bar-type terminal's body.

The flip-type terminal is composed of a body, a flip, and a hinge device for rotatably connecting the flip to the body. The body of the flip-type terminal has the same configuration as the body of the bar-type terminal. The flip-type terminal has an advantage in that, during a standby mode, mistaken operation of the key pad is avoided because the key pad is covered with the flip.

The folder-type terminal consists of a body, a folder and a hinge device for connecting the folder to the body rotatably. The folder is opened or closed through rotation in relation to the body. During a standby mode, i.e., when the folder is closed on the body, the key pad is covered by the folder. This avoids mistaken operation of the key pad. During a speech mode, i.e. when the folder is opened from the body, a sufficient distance is established between the transmitter and the receiver for convenient use of the keypad. This is beneficial for a compact size.

As mobile communication services are rapidly developing, new services are arising that extend beyond the conventional short message service and audio communication, including motion picture, video communication, and monetary services.

Such an expansion of fields of service has caused conventional terminals to be equipped with additional devices, such as a camera lens unit. In addition, as portable wireless terminals become widely popular, not only function but also various matters of taste for consumers, such as design aesthetics and portability, have been added to the factors distinguishing various models.

Consequently, various forms of portable wireless terminals are coming to market, for example: a folder-type terminal whose folder is adapted to rotate about two axes of rotation; a bar-type terminal having an upper body and a lower body coupled to the upper body, wherein the lower body can rotate about a longitudinal axis of rotation of the upper body, enabling its front and rear sides to be reversed; and a sliding-type terminal having a main body and a sub-body coupled to the main body, wherein the sub-body can move horizontally on the front side of the main body.

However, despite such diversified designs of portable wireless terminals, their desktop chargers are still limited by conventional designs. In particular, in the case of the above-mentioned folder-type terminal with two axes of rotation and the sliding-type terminal, the terminals still can be opened or closed and their key pads can be operated while they are mounted on their conventional desktop chargers. Nevertheless, in the case of the bar-type terminal whose lower body can rotate about the longitudinal axis of the upper body, there is a problem in that the lower body cannot rotate properly when the terminal is mounted on its desktop charger.

SUMMARY OF THE INVENTION

Accordingly, the present invention has been made to solve the above-mentioned problems occurring in the prior art, and an object of the present invention is to provide a desktop charger ensuring proper operation of a portable wireless terminal, which may be opened, closed, or rotated in a variety of ways, even during charging.

Another object of the present invention is to provide a desktop charger ensuring proper rotation of the lower body, even during charging, of a bar-type portable wireless terminal having an upper body and a lower body coupled to the upper body, the lower body being capable of rotating about a longitudinal axis of rotation of the upper body.

Still another object of the present invention is to provide a desktop charger for a portable wireless terminal, enabling connection with auxiliary devices, such as an external storage device, a personal computer, and other data communication devices, even during charging.

In order to accomplish these objects, there is provided a desktop charger for a bar-type portable wireless terminal having an upper body and a lower body coupled to the lower end of the upper body, the lower body being capable of rotating about an axis of rotation extending in the longitudinal direction of the upper body, the desktop charger comprising: a charger housing; a slot for receiving and holding the terminal, the slot being recessed a determined depth from a front side toward a rear side of the charger housing; and an opening for providing a rotation space for the lower body of the terminal, the opening extending from a side of the slot in the transverse direction and penetrating the charger housing from its front side to its rear side.

In accordance with another aspect of the present invention, there is provided a desktop charger for a bar-type portable wireless terminal having an upper body and a lower body coupled to the lower end of the upper body, the lower body being capable of rotating about an axis of rotation extending in the longitudinal direction of the upper body, the desktop charger comprising: a charger housing; a slot for receiving and holding the terminal, the slot being recessed a determined depth from the front side toward the rear side of the charger housing; an opening for providing a rotation space for the lower body of the terminal, the opening extending from a side of the slot in the transverse direction and penetrating the charger housing from its front side to its rear side; a support which is pivotally assembled with the rear side of the charger housing and which can be rotated and opened while supporting the charger housing; a first slope surface extending from the rear side of the charger housing, the first slope surface facing and being closed by the lower end of the support, when the support is folded; and a second slope surface extending from the upper end of the first slope surface to the rear side of the charger housing, the second slope surface forming a continuous curved surface with the rear surface of the support, when the support is folded.

In accordance with still another aspect of the present invention, there is provided a desktop charger for a portable wireless terminal, comprising: a charger housing; a slot for receiving and holding a stationary body of the terminal, the slot being recessed a determined depth from the front side toward the rear side of the charger housing; and an opening for providing a rotation space for a rotatable body coupled to an end of the stationary body rotatably, the opening extending from a side of the slot in the transverse direction and penetrating the charger housing from its front side to its rear side.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Desktop chargers for portable wireless terminals according to preferred embodiments of the present invention will be described below with reference to the accompanying drawings. In the following description of the present invention, a detailed description of known functions and configurations incorporated herein will be omitted when it may make the subject matter of the present invention rather unclear.

Figure 1:
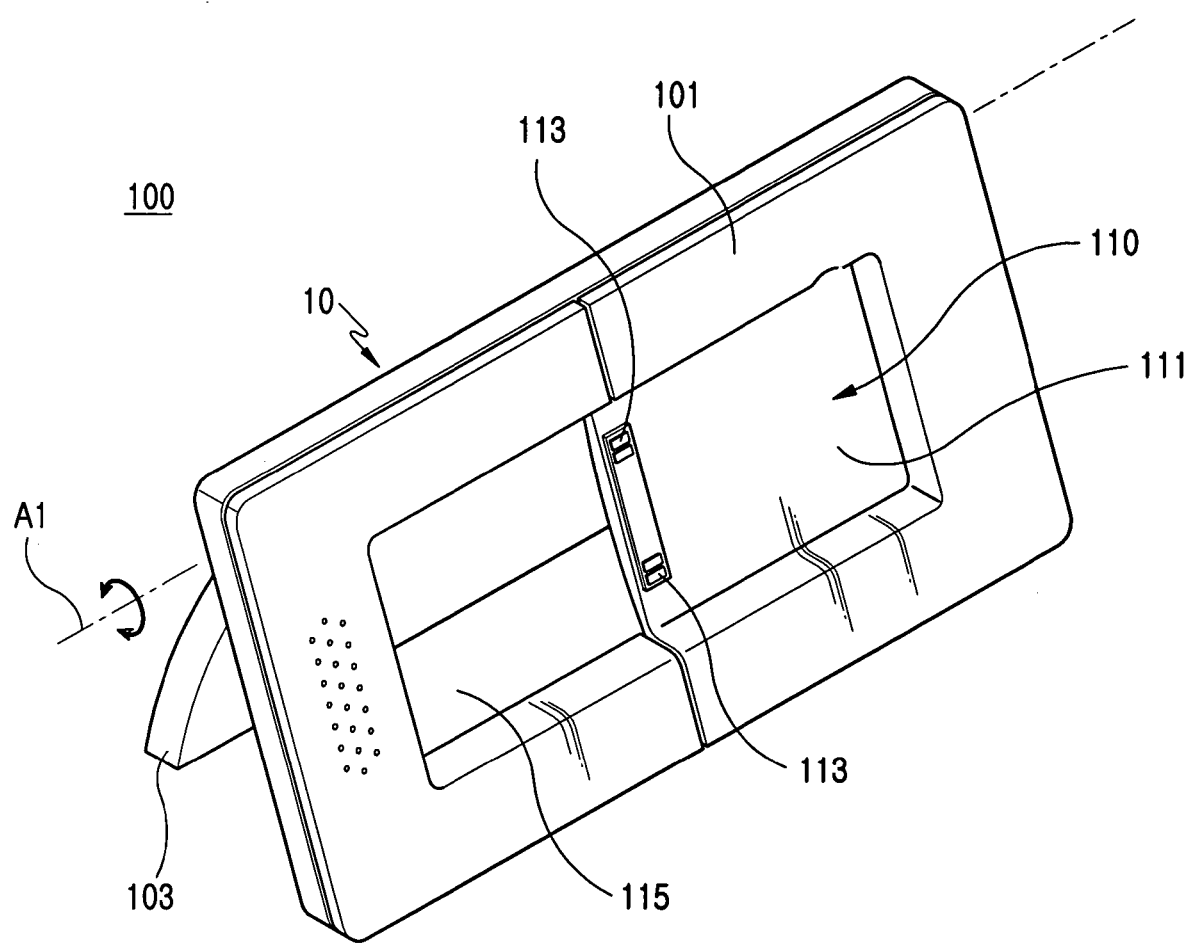
FIG. 1 is a perspective view of a desktop charger for a bar-type portable wireless terminal according a preferred embodiment of the present invention.

FIG. 1 is a perspective view of a desktop charger 100 for a bar-type portable wireless terminal 300 (shown in FIG. 3) according to a preferred embodiment of the present invention.

Figure 2:
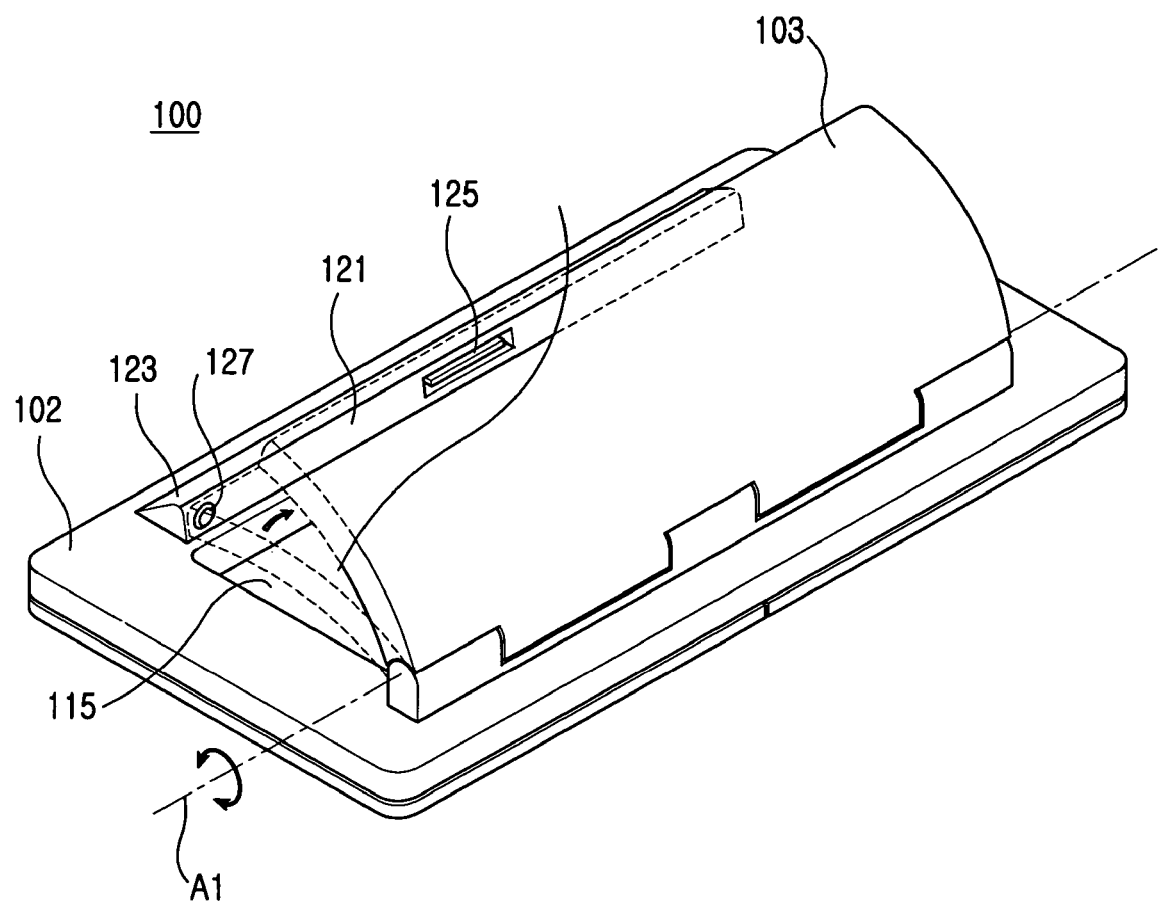
FIG. 2 is a perspective rear-side view of the desktop charger shown in FIG. 1.

FIG. 2 is a perspective view of the rear side 102 of the desktop charger 100 shown in FIG. 1.

As shown in FIGS. 1 and 2, the desktop charger 100 for a bar-type portable wireless terminal 300 comprises a charger housing 10, a slot 110 and a support 103. The bar-type portable wireless charger 300 is composed of an upper body 301 and a lower body 302. The lower body 302 is coupled to the lower end of the upper body 301 and is adapted to rotate about an axis of rotation A2 extending in the longitudinal direction of the upper body 301.

The slot 110 consists of a resting surface 111 recessed from the front side 101 toward the rear side 102 of the charger housing 10 and an opening 115. The upper body 301 of the terminal 300 rests on the resting surface 111 and the lower body 302 of the terminal 300 is positioned in the opening 115, extending from a side of the resting surface 111 in the transverse direction.

The resting surface 111 is depressed a certain depth from the front side 101 of the charger housing 10. A charging terminal 113 is provided at a certain location on the resting surface 111 to supply power for charging the terminal 300.

The opening 115, extending from a side of the resting surface 111 in the transverse direction, penetrates the charger housing 10 from its front side 101 to its rear side 102. The opening 115 is surrounded by closing walls. The opening 115 provides a rotation space for the lower body 302, which is rotatably coupled to the upper body 301 of the terminal, as will be described below in more detail with reference to FIGS. 3 through 7.

The support 103 is hinged at the rear side 102 of the charger housing 10 and is capable of rotating about an axis of rotation A1 extending laterally. If the support 103 is unfolded to a determined angle, the slot 110 is slanted at a determined angle relative to the plane, because the charger housing 10 rests with a tilt on the plane. The opening 115 is closed when the support 103 is folded to the rear side 102 of the charger housing 10 and is opened when the support 103 is unfolded from the rear side 102 of the charger housing 10.

Meanwhile, the charger housing 10 may be provided with first and second slope surfaces 121, 123 extending from the rear side 102. The upper ends of the first and second slope surfaces 121, 123 are connected to each other.

When the support 103 is folded, the first slope surface 121 is closed by the lower end of the support 103. The first slope surface 121 is provided with a power input terminal 127 for external input of charging power for the desktop charger 100. The first slope surface 121 may also be provided with a multi-connector 125 for connection with auxiliary devices for the portable wireless terminal, such as an external storage device, a personal computer, and other information communication devices. Of course, the power input terminal 127 and the multi-connector 125 can be positioned at various locations, including the lateral sides, the upper end and the front side 101 of the charger housing 10.

Preferably, the second slope surface 123 is continuous with, and forms the same curved surface with the rear surface of the support 103, when the support 103 is folded on the rear side 102 of the charger housing 10, for aesthetic reasons. This also makes it more convenient to carry the desktop charger 100 with the support 103 folded.

Figure 5:
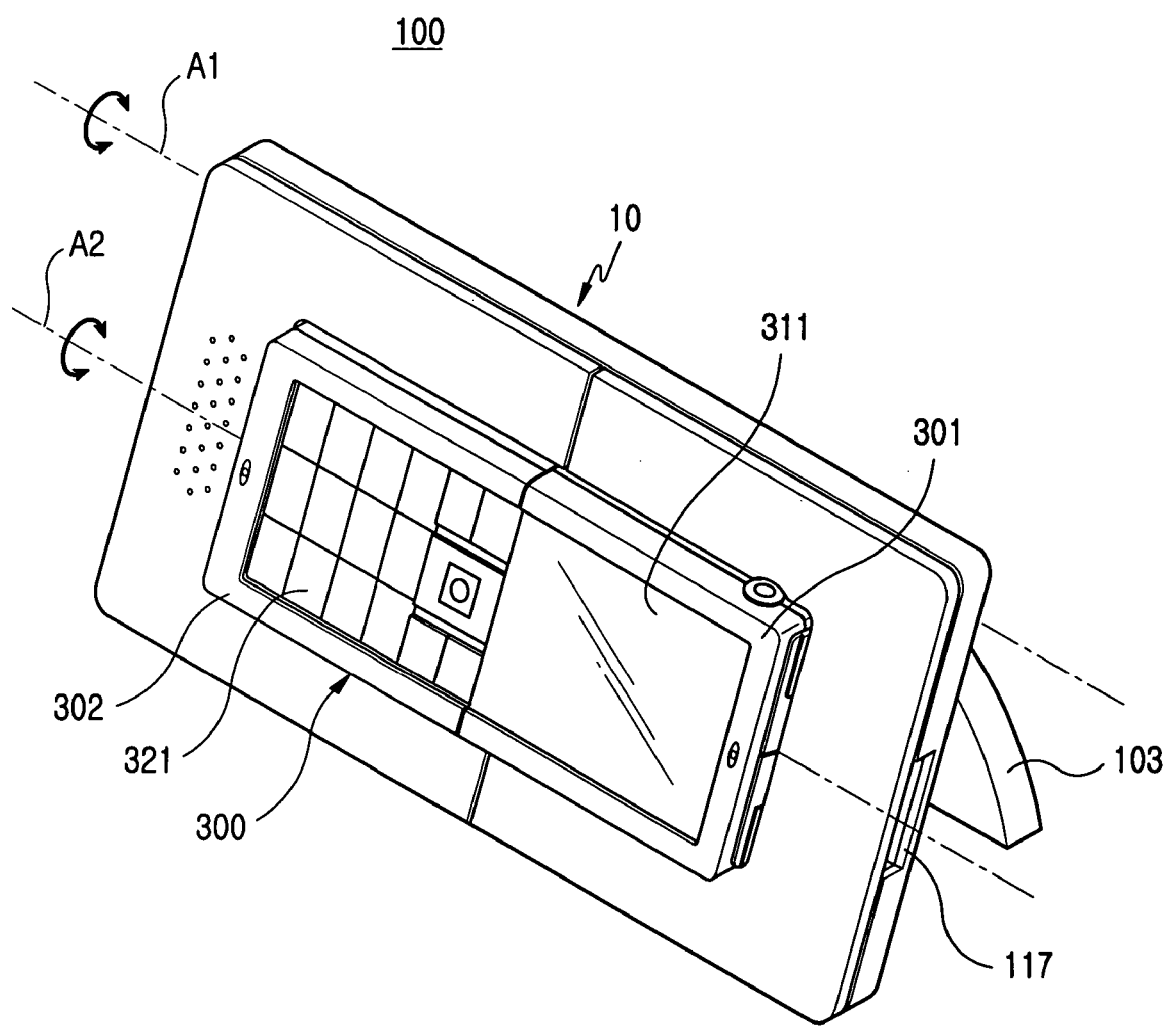
FIG. 5 is a perspective view of the desktop charger shown in FIG. 1 coupled with a portable wireless terminal.

In addition, the charger housing 10 is provided with an MMC (Man Machine Communication) slot 117, such as an ear-microphone jack, as shown in FIG. 5.

Figure 3:
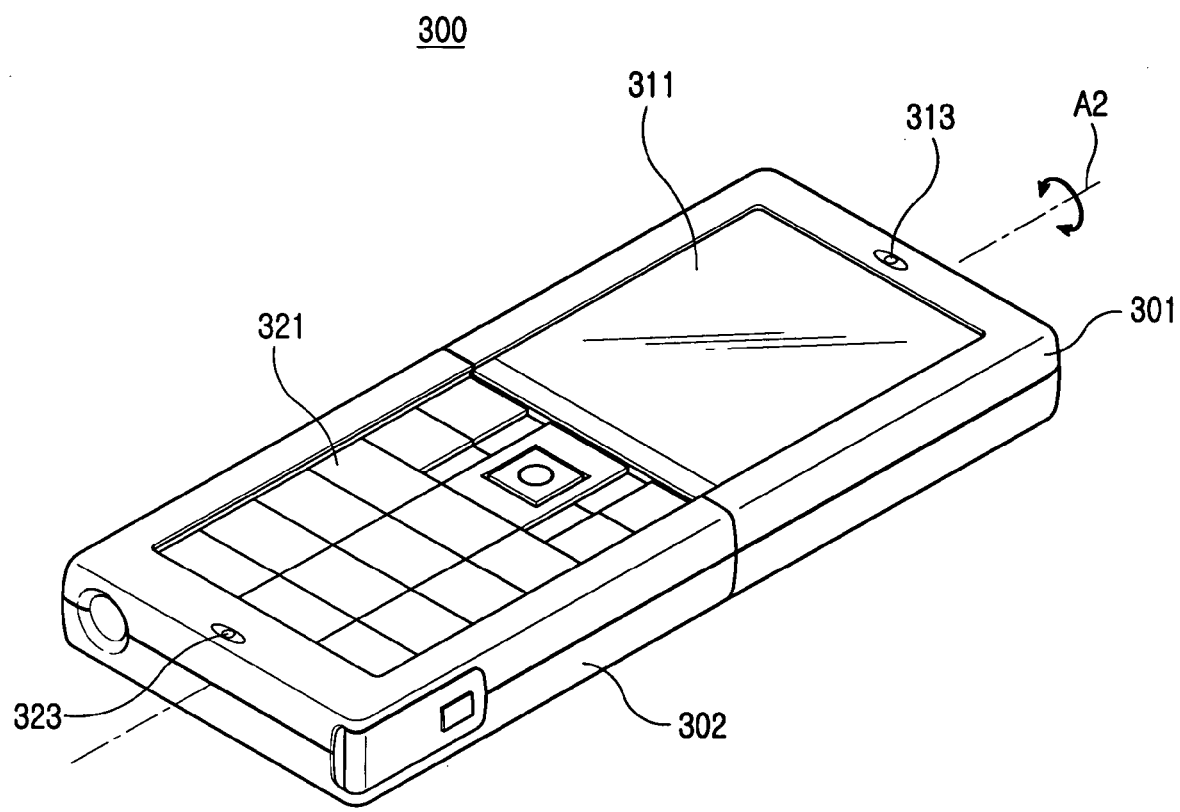
FIG. 3 is a perspective view of a bar-type portable wireless terminal to be mounted on the desktop charger shown in FIG. 1.
Figure 4:
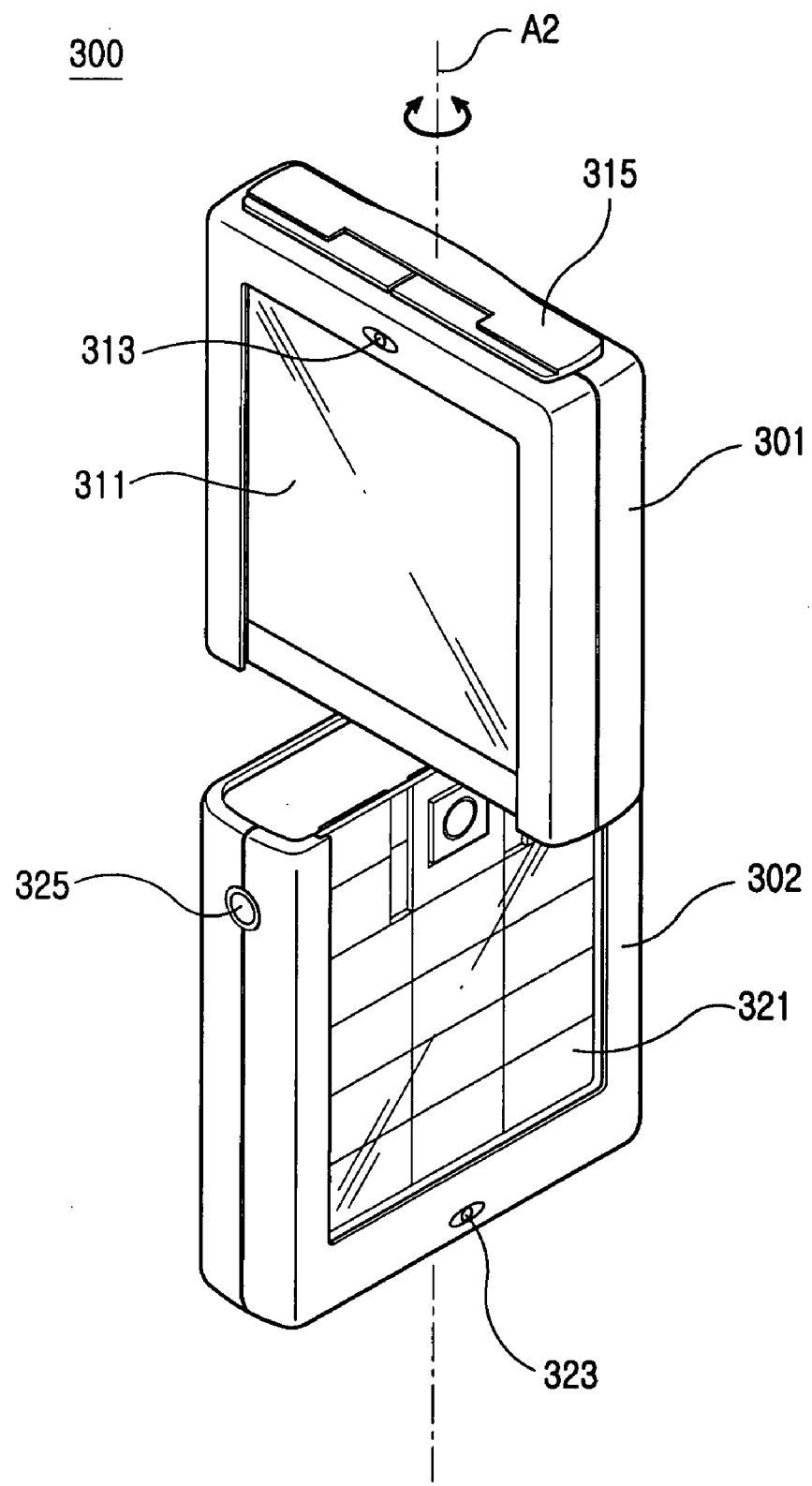
FIG. 4 is a perspective view of the bar-type portable wireless terminal shown in FIG. 3, with its lower body rotated.

The bar-type portable wireless terminal 300 will now be described in more detail with reference to FIGS. 3 and 4.

The bar-type portable wireless terminal 300 is composed of an upper body 301 and a lower body 302.

The upper body 301 comprises a display device 311 on its front side and a receiver 313 positioned above the display device 311. The display device 311 may comprise a touch screen, if desired. The upper body 301 may also be provided with an MMC slot 315, consisting of, for example, a multi-connector or an ear-microphone jack, on the upper end.

The lower body 302 is coupled to the lower end of the upper body 301 rotatably. The axis of rotation A2 of the lower body 302 extends in the longitudinal direction of the upper body 301. Therefore, the lower body 302 rotates in relation to the upper body 301. The lower body 302 comprises a key pad 321 on its front side, a transmitter 323 positioned below the key pad 321, and a camera lens unit 325 incorporated therein for photographing in the lateral direction thereof. Any picture taken by the camera lens unit 325 is displayed through the display device 311 to the user. When the display device 311 is composed of a touch screen, a menu enabling a simple edit of the picture may be implemented on the display device 311.

If the lower body 302 is rotated and the camera lens unit 325 faces in the same direction as the display device 311, the user can perform video communication. If the lower body 302 is rotated and the camera lens unit 325 faces in the opposite direction from the display device 311, the user can take pictures with the terminal 300.

Figure 6:
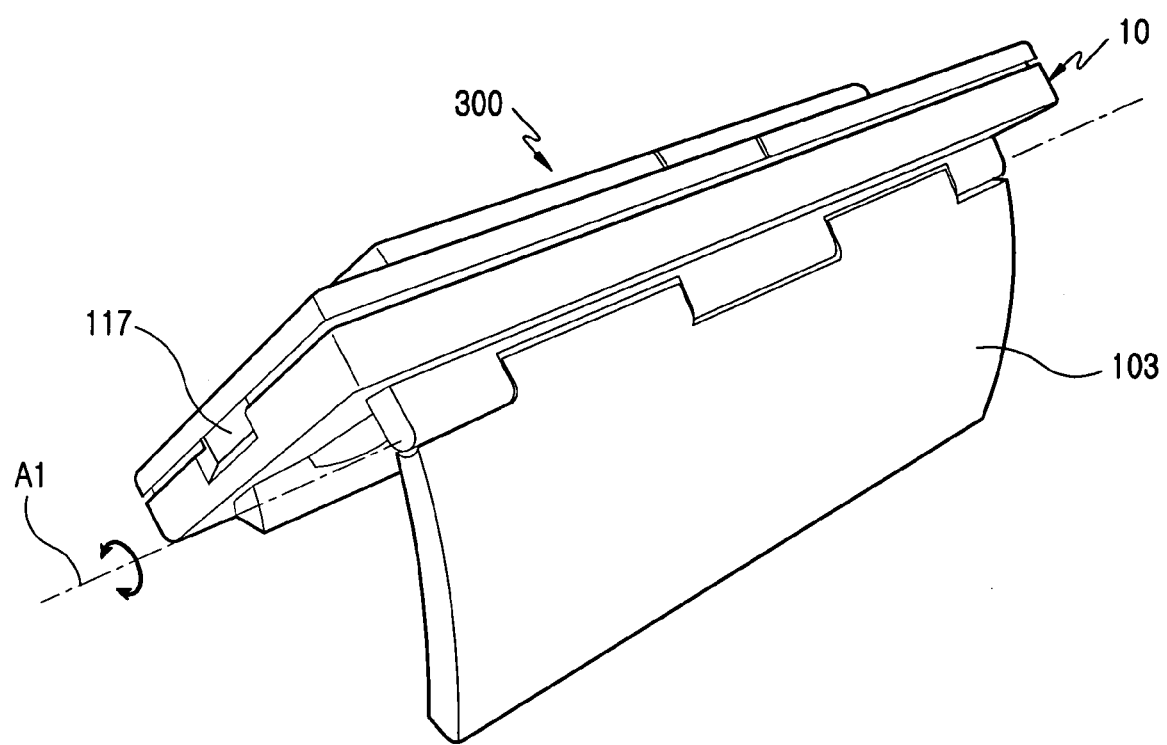
FIG. 6 is a perspective rear-side view of the desktop charger shown in FIG. 1 coupled with a portable wireless terminal.
Figure 7:
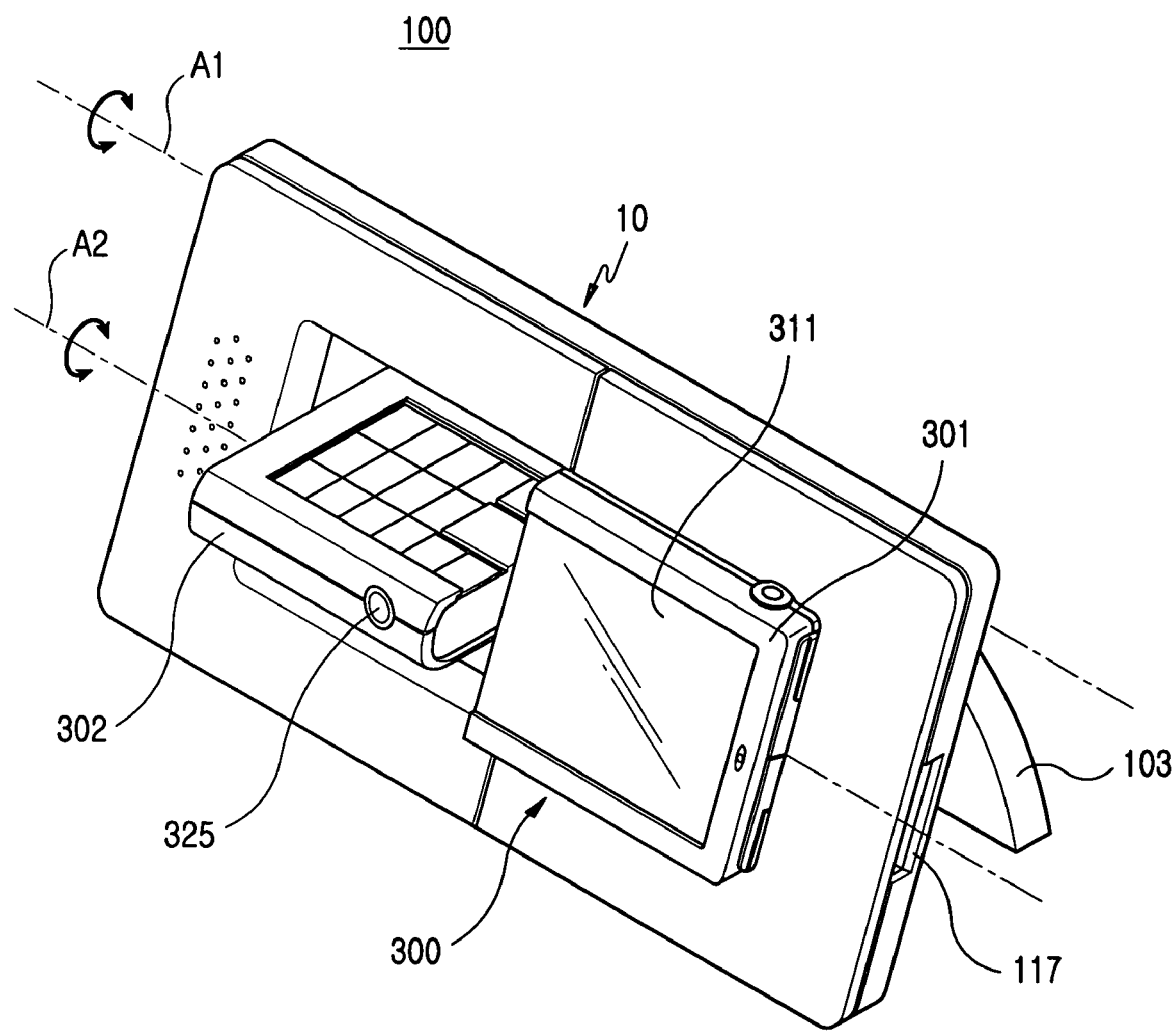
FIG. 7 is a perspective rear-side view of the desktop charger shown in FIG. 1 coupled with a portable wireless terminal, with its lower body rotated.

FIGS. 5 through 7 show the desktop charger 100 mounted with the portable wireless terminal 300.

The upper body 301 of the terminal 300 is mounted on the resting surface 111 of the charger housing 10. The battery of the terminal 300 is then charged by means of the charging terminal 113 on the resting surface 111. The lower body 302 is positioned in the opening 115 of the charger housing 10. Therefore, the lower body 302 can rotate freely even when the terminal 300 is mounted on the charger 100.

As shown in FIG. 7, when the terminal 300 is mounted on the charger 100, the user can perform video communication in a convenient way if the lower body 302 is rotated a determined angle. For the convenient video communication, the lower body 302 is preferably rotated 90° in relation to the upper body 301. Furthermore, the user can enjoy excellent quality of speech by using an ear-microphone through the MMC slot 117 provided on a side of the charger housing 10.

In addition, if the multi-connector 125 on the rear side of the charger housing 10 is connected with an auxiliary device or a data communication device, any picture stored in the terminal 300 or any data transmitted/received by the terminal 300 can be shared with the auxiliary device or the data communication device, during charging the terminal 300.

Meanwhile, even if the lower body 302 is rotated a certain angle relative to the upper body 301, the lower body 302 does not leave the front side of the charger housing 10. Consequently, external damage to the lower body 302 can be avoided.

Figure 8:
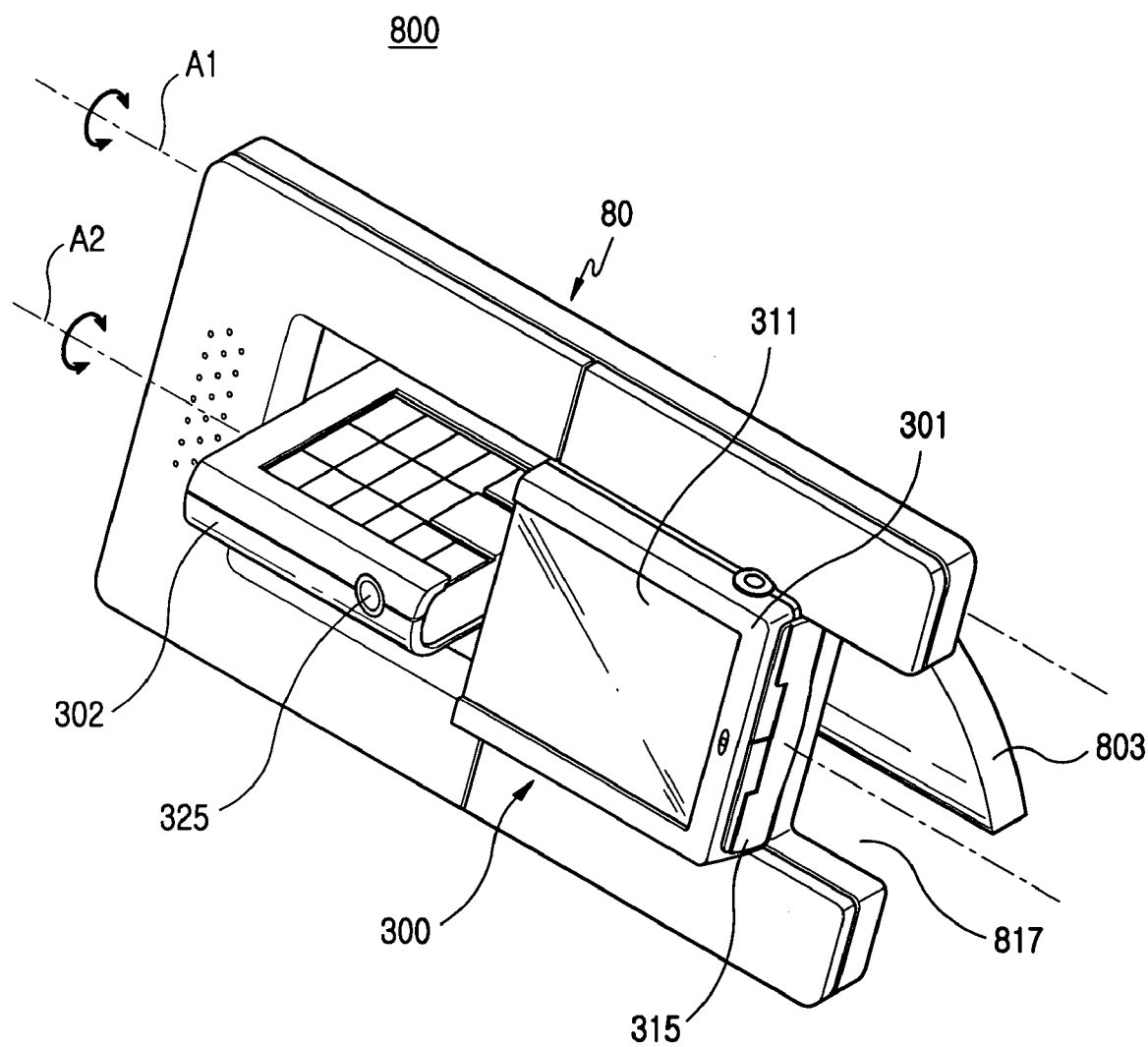
FIG. 8 is a perspective of a desktop charger according to another embodiment of the present invention mounted with a bar-type portable wireless terminal.

FIG. 8 is a perspective of a desktop charger 800 according to another embodiment of the present invention, wherein the desktop charger 800 is mounted with a bar-type portable wireless terminal 300.

Figure 9:
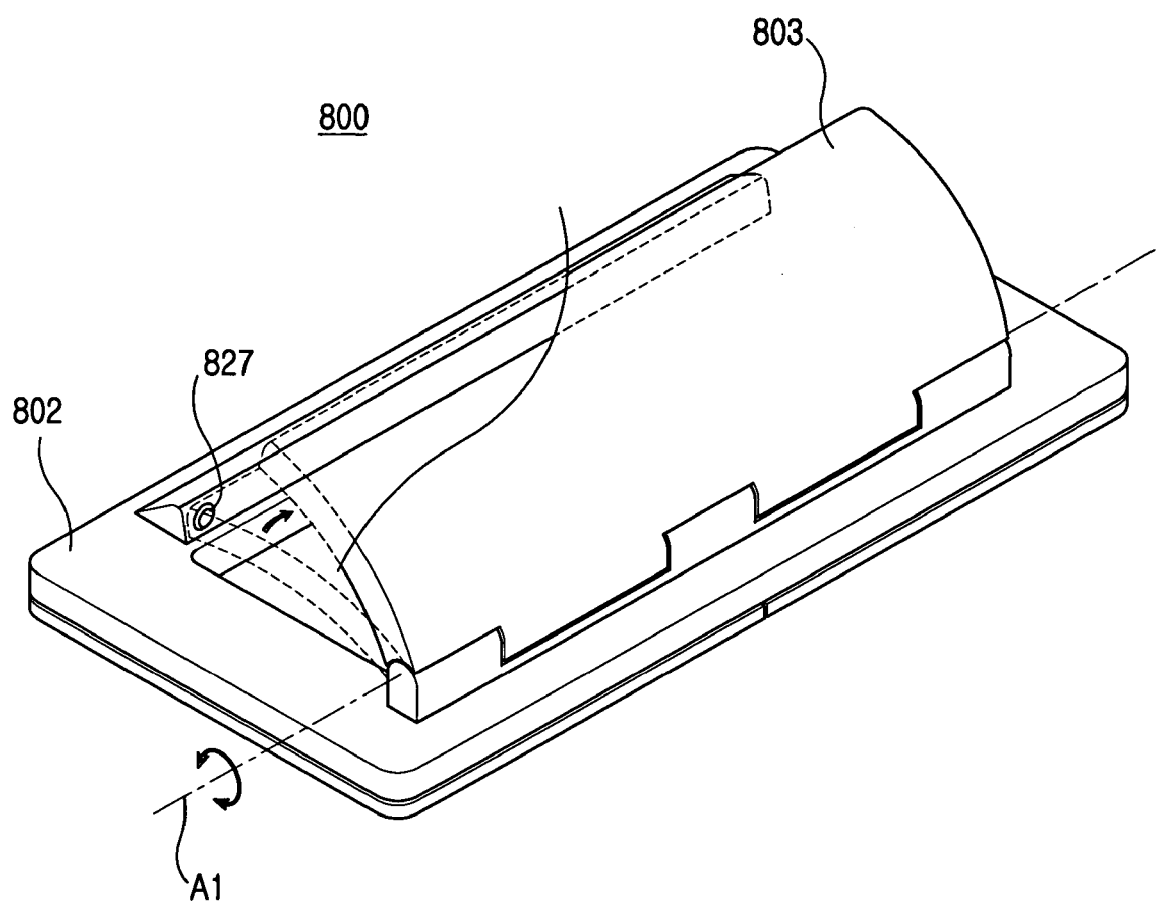
FIG. 9 is a perspective rear-side view of the desktop charger shown in FIG. 8.

FIG. 9 is a perspective view of the rear side 802 of the desktop charger 800 shown in FIG. 8.

For any component of the desktop charger 800 according to the present embodiment, which corresponds to that of the desktop charger 100 according to the previous embodiment, detailed description thereof will be omitted.

The desktop charger 800 according to this embodiment has a recess 817 formed at a side of the charger housing 80, instead of any additional MMC slot 117 (as shown in FIG. 5). The recess 817 exposes the MMC slot 315 of the terminal 300. This enables the user to connect the terminal 300 with another communication device or an ear-microphone directly through the MMC slot 315.

The charger housing 80 is provided with a support 803 hinged at the rear side 802 and a terminal 827 which is opened or closed as the support 803 is unfolded or folded. The terminal 827 is connected with a power cable to supply power for the charger 800.

Meanwhile, the desktop charger 800 can accommodate wireless connection with an auxiliary device or another data communication device by means of a Bluetooth module or an infrared communication module incorporated therein. Consequently, any additional multi-connector 125 (as shown in FIG. 2) or the like for connection with another data communication device will be unnecessary.

As described above, the desktop charger according to the present invention is developed for a bar-type portable wireless terminal having an upper body and a lower body which is capable of rotating about an axis of rotation extending in the longitudinal direction. As such, the lower body can rotate even when the terminal is mounted on the charger for charging its battery. Therefore, the user can advantageously perform video communication during charging by making the display device and the camera lens unit face the user. In addition, wireless communication modules installed at the desktop charger, such as a multi-connector, a Bluetooth module, or an infrared communication module, make the connection with an auxiliary device or another data communication device easier.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A desktop charger for a bar-type portable wireless terminal having an upper body and a lower body coupled to the lower end of the upper body, the lower body being capable of rotating about an axis of rotation extending in the longitudinal direction of the upper body, the desktop charger comprising:
    a charger housing; and
    a slot provided with a resting surface being recessed a determined depth from a front side toward a rear side of the charger housing and an opening extending from a side of the slot in a transverse direction,
    wherein the upper body is mounted on the resting surface and the opening penetrates the charger housing from the front side to the rear side of the charger housing for providing a rotation space for the lower body of the terminal.

2. The desktop charger according to claim 1, further comprising a charging terminal on the slot to supply power for charging the terminal.

3. The desktop charger according to claim 1, further comprising a Man Machine Communication (MMC) slot on a lateral side of the charger housing.

4. The desktop charger according to claim 1, further comprising a support which is pivotally assembled with the rear side of the charger housing, the resting surface being slanted a predetermined angle relative to a plane when the support has been rotated and opened while supporting the charger housing.

5. The desktop charger according to claim 4, further comprising a power input terminal provided on the rear side of the charger housing, the power input terminal being opened or closed as the support is unfolded or folded.

6. The desktop charger according to claim 4, further comprising a multi-connector provided on the rear side of the charger housing, the multi-connector being opened or closed as the support is unfolded or folded.

7. The desktop charger according to claim 1, wherein the opening is surrounded by closing walls.

8. The desktop charger according to claim 1, further comprising an opening extending from an end of the slot to an end of the charger housing to expose an upper end of the upper body of the terminal mounted on the slot.

9. A desktop charger for a bar-type portable wireless terminal having an upper body and a lower body coupled to the lower end of the upper body, the lower body being capable of rotating about an axis of rotation extending in the longitudinal direction of the upper body, the desktop charger comprising:
 a charger housing;
 a slot provided with a resting surface being recessed a determined depth from a front side toward a rear side of the charger housing and an opening extending from a side of the slot in a transverse direction,
 a support which is pivotally assembled with the rear side of the charger housing and which can be rotated and opened while supporting the charger housing;
 a first slope surface extending from the rear side of the charger housing, the first slope surface facing and being closed by a lower end of the support, when the support is folded; and
 a second slope surface extending from an upper end of the first slope surface to the rear side of the charger housing, the second slope surface forming a continuous curved surface with a rear surface of the support, when the support is folded,
 wherein the upper body is mounted on the resting surface and the opening penetrates the charger housing from the front side to the rear side of the charger housing for providing a rotation space for the lower body of the terminal.

10. The desktop charger according to claim 9, further comprising a multi-connector provided on the first slope surface for connection with an external device.

11. The desktop charger according to claim 9, further comprising a power input terminal provided on the first slope surface for external power input.

12. The desktop charger according to claim 9, further comprising a Man Machine Communication (MMC) slot on a lateral side of the charger housing.

13. A desktop charger for a portable wireless terminal, comprising:
 a charger housing;
 a slot provided with a resting surface being recessed a determined depth from a front side toward a rear side of the charger housing and an opening extending from a side of the slot in a transverse direction;
 wherein a stationary body of the terminal is mounted on the resting surface and the opening penetrates the charger housing from the front side to the rear side of the charger housing for providing a rotation space for a body rotatably coupled to an end of the stationary body.

14. The desktop charger according to claim 13, further comprising a charging terminal on the resting surface to supply power for charging the terminal.

15. The desktop charger according to claim 13, wherein the opening is surrounded by closing walls.

16. The desktop charger according to claim 13, further comprising a support which is pivotally assembled with the rear side of the charger housing, the resting surface being slanted a predetermined angle relative to a plane when the support has been rotated and opened while supporting the charger housing.

* * * * *